United States Patent Office 3,306,474
Patented Feb. 28, 1967

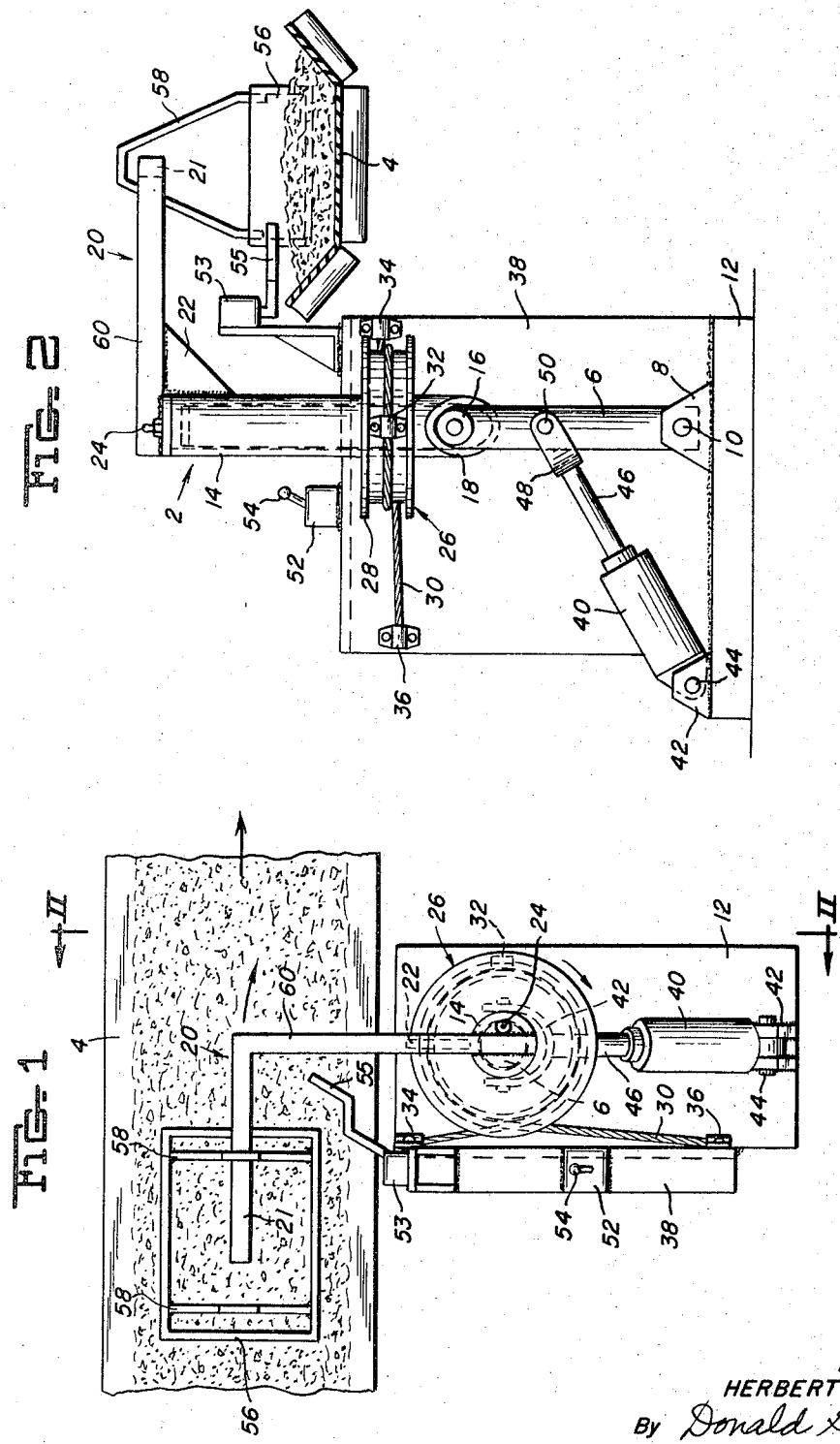

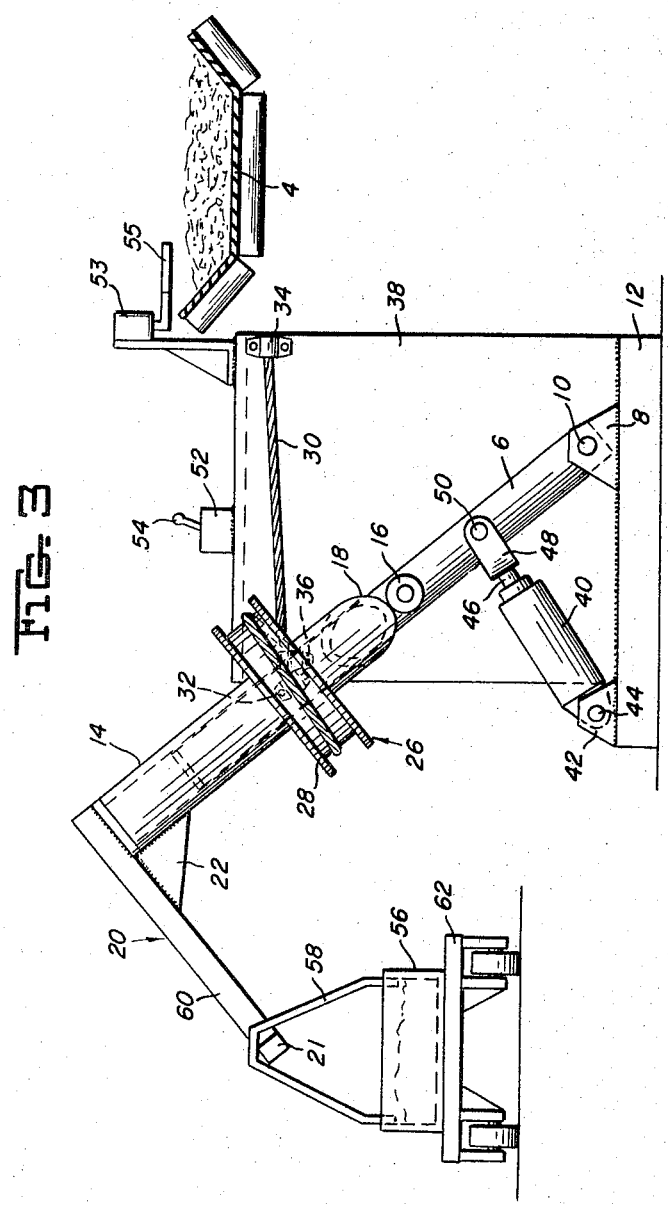

3,306,474
TRANSFER APPARATUS FOR CONVEYOR
SAMPLING BASKETS
Herbert J. Curtis, Hobart, Ind., assignor to United States
Steel Corporation, a corporation of Delaware
Filed July 22, 1965, Ser. No. 474,070
3 Claims. (Cl. 214—1)

The present invention relates generally to material handling apparatus and more particularly to transfer apparatus especially suitable for transferring sampling baskets from a traveling conveyor.

During the operation of belt-type conveyors for handling materials such as sinter, coal, coke, ore, and the like, it is frequently required that a representative sample of the material be taken at regular intervals so that material quality can be checked and controlled. Prior to my invention, it was common practice to obtain such samples by holding a long handled shovel or similar implement manually under the hopper which discharged the material onto the conveyor. This method was, at best, crude, laborious, and hazardous and did not provide a truly representative sample.

Another method of sampling, which was an improvement over the above described "shovel" method, consisted of placing a basket on the conveyor at a point upstream from the hopper station and allowing the material to fall into the basket as the basket passed under the discharge spout of the conveyor. This method, although an improvement over the previously described "shovel" method, presented the problem of removing the sampling basket without stopping the conveyor.

It is, accordingly, an object of my invention to provide a unique apparatus for transferring sampling baskets from a moving conveyor which includes an arm projecting over the conveyor from a mast-mounted sleeve adapted to engage the bail of a sampling basket, and drum-and-cable means on the sleeve for turning the same as the mast is downtilted laterally away from the conveyor after the arm has engaged the bail of a sampling basket.

This and other objects will become more apparent after referring to the following specification and attached drawings, in which:

FIGURE 1 is a plan view;
FIGURE 2 is a side elevational view taken substantially along the lines II—II of FIGURE 1; and
FIGURE 3 is a view similar to FIGURE 2 but showing the position of the apparatus of the invention after it has removed a sampling basket from the conveyor.

Referring more particularly to the drawings, reference numeral 2 designates generally the transfer apparatus of the invention which is shown installed adjacent a continuous belt conveyor 4. The transfer apparatus 2 includes a mast 6 which is pivotally mounted at its lower end in a clevis bracket 8 by means of a pin 10. The clevis bracket 8 is secured to a foundation pad 12 adjacent to and below the load-carrying flight of the belt conveyor 4.

A sleeve 14 is slidably and rotatably mounted on the upper end of the mast 6 with the lower end of the sleeve resting on a cam roller 16 which is affixed to the mast 6 intermediate its length. The lower end of the sleeve 14 is cut off at an angle so as to form an inclined cam surface 18, as best shown in FIGURE 2. The cooperation of the cam surface 18 and the cam roller 16 effect raising and lowering of the sleeve relative to the mast when it is rotated, as will become apparent.

An L-shaped arm 20 projects radially from the upper end of the sleeve 14 and extends over the conveyor 4. The distal portion or short branch 21 of the arm 20 is normally directed parallel with the direction of travel of the conveyor and extends toward the upstream end of the conveyor. A support gusset 22 provides rigidity to the arm 20. A grease fitting 24 is provided through the upper end of the sleeve 14 to permit the introduction of lubricant between the inner surface of the sleeve 14 and the outer surface of the mast 6.

A drum-and-cable means, designated generally by reference numeral 26, is mounted on the sleeve 14 above its lower end. The drum-and-cable means includes a pulley 28 circumferentially mounted on the sleeve for rotation therewith and a cable 30 looped once around the pulley and secured thereto by means of a clamp 32. Opposite ends 34 and 36 of the cable 30 are anchored in spaced relation to each other to an upstanding support panel 38 which is disposed adjacent to the mast 6, as best shown in FIGURES 2 and 3.

A fluid-pressure cylinder 40 is pivotally mounted by its head end in a clevis 42 on the foundation pad 12 by means of a pin 44. A piston rod 46 projects from the cylinder 40 in the direction toward the mast 6 and is provided on its projecting end with a clevis 48 which fits around the mast 6 and is connected therewith by means of a pin 50. A valve 52 having an actuating lever 54 projecting therefrom is mounted on the panel 38 and is connected with the cylinder 40 for operating the same. A limit switch 53 having an actuating arm 55 is mounted on the support panel 38 with the actuating arm projecting over the conveyor in the path of a sampling basket 56 traveling thereon. The switch 53 is connected with the valve 52 in a conventional manner to cause actuation of valve 52 to retract the piston rod 46 of cylinder 40 when the arm 55 is tripped.

In operation, the transfer apparatus is normally positioned at a transfer station along the length of the conveyor with the mast in upstanding vertical position adjacent the conveyor 4 and the arm 20 extending over the conveyor with its distal portion 21 directed toward the upstream end of the conveyor belt. As the sampling basket 56 traveling on the conveyor approaches the transfer apparatus the bail 58 rides along the distal portion 21 of the arm 20 until the bail reaches the proximate portion 60 of arm 20 which extends normal to the distal portion 21. At this time, the arm 55 of the switch 53 is tripped by the basket and valve 52 is thereby actuated to introduce pressure fluid into the rod end of the cylinder 40 to cause retraction of the piston rod 46. As the piston rod 46 retracts, it pivots the mast 6 to downtilted position laterally away from the conveyor, as best shown in FIGURE 3. As the mast is thus downtilted, the drum-and-cable means 26 causes the sleeve 14 to rotate. As the sleeve starts to rotate it spirals upwardly due to the interaction of the inclined cam surface 18 and the roller 16. This interaction effects lifting of the sampling basket from the conveyor belt by the arm 20 and removal thereof from the conveyor to a pallet or dolly 62, as shown in FIGURE 3. The dolly or pallet 62 with the basket resting thereon is then moved away from the transfer apparatus in the direction parallel with the distal portion 21 of the arm 20. As the dolly is so moved the bail 58 of the basket slides along and off of the distal portion of the arm. Then the valve 52 is actuated by manual manipulation of actuating lever 54 to introduce pressure fluid into the head end of the cylinder 40 to cause projection of the piston rod 46 and effect return of the mast to its original upright position with the distal portion 21 of the arm 20 extending over the conveyor along the center line thereof ready to receive another sampling basket.

While I have shown the transfer apparatus of the invention fixedly mounted adjacent a conveyor 4, it will be understood that it may be mounted on a wheeled platform and thus be made portable so that it can be used with other conveyors, as desired.

Although I have shown but one embodiment of my invention, it will be apparent that other adaptations and modifications may be made without departing from the scope of the following claims.

I claim:

1. Apparatus for unloading containers from a conveyor comprising a mast pivoted adjacent the conveyor for downtilting movement laterally thereof, means for effecting such movement, a sleeve slidable and rotatable on said mast, an arm projecting from said sleeve over the conveyor to engage a container approaching thereon, cam means on said mast and sleeve effective to raise said sleeve on rotation thereof, and drum-and-cable means for rotating said sleeve as it tilts downwardly.

2. Apparatus as defined by claim 1 in which said means for effecting downtilting movement of said mast includes a fluid pressure cylinder pivotally mounted by its head end adjacent said mast, and a piston rod projecting from said cylinder, said piston rod being pivotally connected with said mast intermediate the ends thereof.

3. In a conveyor having sampling baskets traveling thereon at spaced intervals, each of said baskets having an upstanding bail, the improvement therewith of apparatus for transferring said baskets from said conveyor which comprises a mast mounted for pivotal movement between a first position vertically upright adjacent said conveyor and a second position downtilted laterally of said conveyor, means for moving said mast between said positions, a sleeve having an upper and lower end slidable and rotatable on said mast, an arm projecting radially from said sleeve and normally extending over said conveyor, said arm being substantially L-shape and having a distal portion parallel with the direction of travel of said conveyor to engage the bail of an approaching basket when the arm is extending over the conveyor, an inclined cam surface on the lower end of said sleeve, a cam roller on said mast adapted to be engaged by said cam surface to move said sleeve axially of said mast upon rotation of the sleeve, drum-and-cable means circumferentially mounted on said sleeve, and means anchoring the ends of the cable of said drum-and-cable means remote from said sleeve on opposite sides thereof whereby said sleeve is rotated to move said arm away from said conveyor when said mast is pivoted to said second position.

References Cited by the Examiner

UNITED STATES PATENTS

| | | | |
|---|---|---|---|
| 1,581,552 | 4/1926 | Skinner et al. | 198—27 X |
| 2,569,705 | 10/1951 | Briggs et al. | 214—1 X |
| 2,573,660 | 10/1951 | Brownell | 214—1 X |

MARVIN A. CHAMPION, *Primary Examiner.*